June 10, 1969  S. CSIMMA  3,448,847
DISCHARGE CHUTE FOR HARVESTING MACHINE
Original Filed July 30, 1964  Sheet 1 of 2
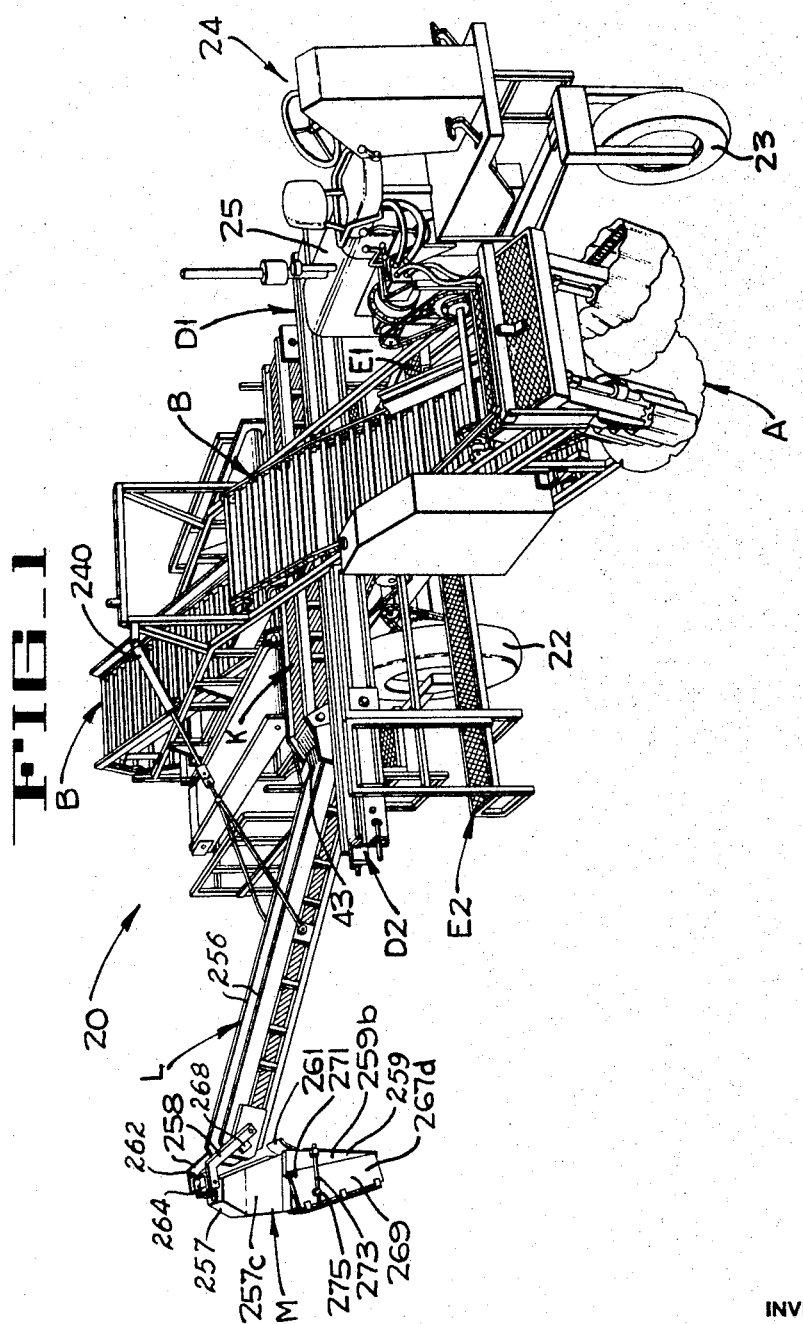
INVENTOR
SANDOR CSIMMA
BY Francis W. Anderson
ATTORNEY

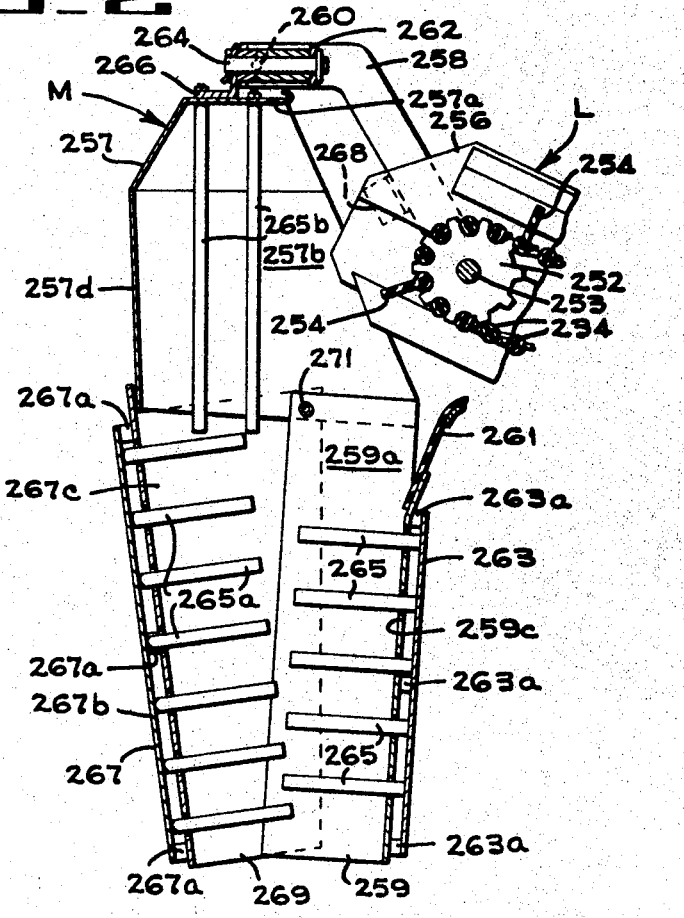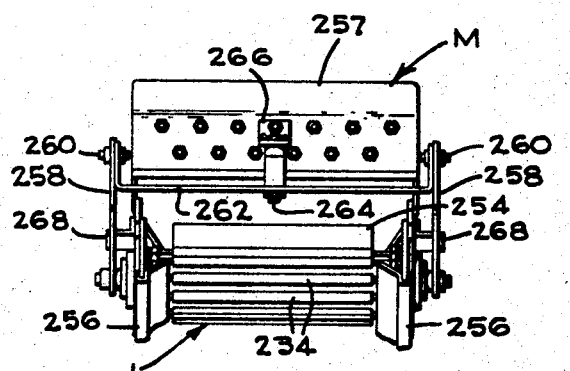

United States Patent Office 3,448,847
Patented June 10, 1969

3,448,847
DISCHARGE CHUTE FOR HARVESTING MACHINE
Sandor Csimma, San Jose, Calif., assignor to FMC Corporation, San Jose, Calif., a corporation of Delaware
Original application July 30, 1964, Ser. No. 386,271, now Patent No. 3,340,935. Divided and this application Mar. 8, 1967, Ser. No. 643,754
Int. Cl. B65g 47/44, 11/12, 11/20
U.S. Cl. 198—72                        4 Claims

ABSTRACT OF THE DISCLOSURE

A fruit discharge elevator in a harvesting machine, adjustable as to inclination, is provided with a pendent chute to declerate and thus gently lower the fruit into an attendant truck. The chute support includes displaceable support arms and swivel connections to the conveyor to prevent damage if the chute strikes or is struck by an obstruction and to otherwise maintain the chute upright. Resilient fingers within the chute define a tortous path to decelerate the fruit.

This is a division of application Ser. No. 386,271, filed July 30, 1964, now Patent No. 3,340,935.

The present invention pertains to harvesting machines and more particularly relates to a discharge chute for gently lowering the harvested fruit into a collection bin carried by an auxiliary vehicle.

More specifically, the discharge chute cooperates with a discharge elevator which is adjustable as to inclination, and the chute includes suspension means coupled to the elevator which maintain the chute upright and provides a yieldable mounting to prevent damage to the chute or to the elevator. Inwardly projecting resilient fingers in the chute define a tortuous path to gently declerate the fruit. An object of the invention, accordingly is to provide a chute for lowering loose, fragile fruit without rupturing or otherwise damaging the fruit.

FIGURE 1 is a diagrammatic perspective of a harvesting machine incorporating the present invention and is viewed from its front end.

FIGURE 2 is a diagrammatic vertical section of the discharge chute of the present invention.

FIGURE 3 is an enlarged fragmentary plan of the discharge chute shown in FIGURE 2.

The general arrangement (FIG. 1) of the harvesting machine 20 includes drive wheels 22, only one wheel 22 being shown, a steerable front wheel 23, and an operator's station 24 from which the driver maneuvers the machine along the rows of vines to be harvested. The machine is self-powered by an engine 25.

A vine digging, severing an gathering mechanism A is mounted at the front end of the machine and transfers the severed vines and any fallen fruit onto an upwardly inclined elevating flght of a main combined feeder and shaker conveyor B. Dirt and vine pieces which are too small to be supported by the shaker conveyor B are discharged onto two laterally extending sorting conveyors D1 and D2. The good fruit is manually sorted from the conveyors D1 and D2 by personnel stationed beside each conveyor upon respectively associated platforms E1 and E2 and placed on a collecting and discharge conveyor K. Any fruit or debris which is not sorted from the conveyors is discharged onto the ground.

The discharge conveyor K transfers the fruit over a bridge at 43 and onto the conveying flight of an associated elevator conveyor L that has a discharge end positioned above a cooperating discharge chute M. The chute M is so designed as to gently lower the fruit therethrough into a collection bin, not shown, that is carried upon an orchard truck moving along beside the harvester.

Bridge 43 provides a smooth transition surface permitting the inclination of the elevator to be adjusted without impairing transfer of fruit onto the elevator.

The elevator L is provided with an endless flight that comprises lateral rods 234 (FIG. 2) having resilient rubber sheaths, some of which are provided with integral pusher blades 254. The elevator flight is driven from its lower end and is trained over an idler sprocket 252 on an idler shaft 253 at its upper end.

The inclination of the elevator L is selected by the manipulation of a valve, not shown, which governs a hydraulic cylinder 240. When the piston rod of the cylinder 240 is extended or retracted, the elevator L pivots about an inboard pivot axis to adjust the elevation of the outer end portion of the elevator.

The elevator L is provided with side members 256 that are each associated with a chute support arm 258; the two arms are pivotally mounted on the idler shaft 253 and mount aligned pivot shaft 260 (FIG. 3) which project inwardly through the ends of a U-shaped bar 262. The bar 262 is provided with a central pivot shaft 264 that is perpendicular to the axes of the pivot shaft 260, and which projects through a bracket 266 that is welded atop the discharge chute M. The discharge chute is thus mounted for universal swinging movement from the elevator, and since it depends from the elevator will remain upright regardless of any usual degree of inclination of the elevator. Each chute support arm 258 normally rests upon an associated stop block 268 that is secured to the adjacent side plate 256. However, if the elevator should be lowered so far that the chute M strikes some obstruction, the arms 258 will pivot away from the stop blocks 268 and thereby prevent damage to the chute M.

The chute M (FIG. 2) comprises an upper enclosure 257 which may be formed of the sheet metal, belting material or other suitable material. The enclosure is provided with a top wall 257a, side walls 257b and 257c, a rear wall 257d, and open side facing the elevator L, and an open lower end. Rigidly attached to the enclosure 257 is a depending, generally U-shaped guide 259 having side walls 259a and 259b, and an innerwall 259c. An outwardly inclined resilient guide flap 261, which lies beneath the discharge end of the elevator, is attached to the upper end of the wall 259c. A removably attached plate 263 is secured by tabs 263a to the side walls 259a and 259b, and plate 263 is provided with a plurality of resilient flexible fingers 265. The fingers 265 may be molded of rubber with integral bolts, not shown, at one end for attachment to the plate 263, or may simply comprise lengths of rubber hose or tubing screwed onto the inwardly projecting shanks of bolts, not shown, inserted through apertures in the plate 263. In either case, substantially the entire length of each finger is free to flex. The fingers extend through corresponding apertures in the guide 259 and coact with opposed resilient fingers 265a to cushion and retard the fall of fruit. The fingers 265a are secured to a mounting plate 267 that is removably secured by tabs 267a to a pivotable, generally U-shaped guide 269 having an outer wall 267b, side walls 267c and 267d, and a pivot connection at 271 to each side wall of the enclosure 257. A locking rod 273 (FIG. 1), only one being shown, is secured to each side of the guide 259 and projects through a thumb screw lock 275 which is secured to the pivotable guide 269. By adjusting the guide 269 about its pivot 271, the lower end discharge throat of the discharge chute M can be made larger or smaller, and the impending action of the resilient fingers 265 and 265a can be increased or reduced by causing more or less of the fingers to intermesh. The removable mounting plates 263 and 267 provide for repair or replacement of the resilient fingers 265 and 265a.

Other resilient fingers 265b depend from the upper wall of the enclosure 257 so as to prevent the fruit from being projected by the elevator conveyor against the rear wall of the enclosure. The discharge chute M provides a gentle lowering action for the relatively fragile fruit which would otherwise be damaged because the field bins into which the fruit is loaded are about four feet deep.

Having thus described the invention, that which is believed to be new and for which protection by the issue of Letters Patent is desired is:

1. In a fruit harvesting machine the combination comprising an upwardly inclined elevator having a conveyor means for discharging fruit from the machine, means mounting said elevator to vary its inclination, a discharge chute defining an upright passage adapted to guide fruit discharged from said elevator, a chute support arm pivotally connected to said elevator and projecting beyond the discharge end of said elevator, stop means mounted on said elevator in supporting engagement with said arm intermediate the ends of said arm, and swivel means interconnecting the free end of said arm and the upper portion of said discharge chute so that the weight of the depending chute causes the chute to remain upright when the elevator inclination is changed, said chute support arm accommodating relative motion between the elevator and the chute if downward swinging movement of the elevator causes the chute to strike an obstruction.

2. Apparatus according to claim 1 wherein said chute is provided with internal resiliently flexible fingers lying in the path of fruit dropped through said upright passage.

3. Apparatus according to claim 1 wherein said chute is provided with two opposed upright walls relatively movable toward and away from each other, and wherein a plurality of inwardly projecting resilient fingers are carried by each of said walls, the fingers associated with one wall being misaligned with the fingers of the other wall to provide a tortuous path for the fruit dropped through said upright passage.

4. A fruit discharge chute comprising wall means defining an open upright passage, means mounting at least two opposed walls for relative movement to selectively enlarge and constrict the passage through the chute toward the lower end thereof, and a plurality of resiliently flexible fingers projecting inwardly from each of said opposed walls, the fingers of one of said walls being so related to the fingers of the opposite wall that said fingers delineate an open tortuous passage through the chute.

References Cited

UNITED STATES PATENTS

| | | | |
|---|---|---|---|
| 838,663 | 12/1906 | Stephens | 198—73 X |
| 952,381 | 3/1910 | Sullivan | 198—72 X |
| 2,702,209 | 2/1955 | James | 193—7 X |

EDWARD A. SROKA, *Primary Examiner.*

U.S. Cl. X.R.

193—7, 16, 21, 27, 32

UNITED STATES PATENT OFFICE
CERTIFICATE OF CORRECTION

Patent No. 3,448,847                                                    June 10, 1969

Sandor Csimma

It is certified that error appears in the above identified patent and that said Letters Patent are hereby corrected as shown below:

Column 1, line 15, "declerate" should read -- decelerate --; line 20, "tortous" should read -- tortuous --; line 36, "declerate" should read -- decelerate --; line 53, "an" should read -- and --; line 56, "flght" should read -- flight --. Column 2, line 36, cancel "the"; line 42, "innerwall" should read -- inner wall --.

Signed and sealed this 17th day of November 1970.

(SEAL)
Attest:

Edward M. Fletcher, Jr.                          WILLIAM E. SCHUYLER, JR.
Attesting Officer                                        Commissioner of Patents